United States Patent
Kreissl et al.

(10) Patent No.: US 7,941,759 B2
(45) Date of Patent: May 10, 2011

(54) INTERACTIVE ANALYSIS OF NETWORK ADJUSTMENT RESULTS

(75) Inventors: Ralph Kreissl, Munich (DE); Joachim Tappe, Munich (DE)

(73) Assignee: Trimble Navigation Limited, Sunnyvale, CA (US)

(*) Notice: Subject to any disclaimer, the term of this patent is extended or adjusted under 35 U.S.C. 154(b) by 845 days.

(21) Appl. No.: 11/904,943

(22) Filed: Sep. 27, 2007

(65) Prior Publication Data
US 2009/0089702 A1 Apr. 2, 2009

(51) Int. Cl.
*G06F 3/048* (2006.01)
*G06F 9/46* (2006.01)
*G01S 5/14* (2006.01)

(52) U.S. Cl. .............. 715/772; 342/357.3; 705/10
(58) Field of Classification Search .............. 715/772; 342/357.14, 357.3; 705/10
See application file for complete search history.

(56) References Cited

U.S. PATENT DOCUMENTS

| | | | |
|---|---|---|---|
| 6,725,097 B1 * | 4/2004 | Basile et al. ............ | 700/1 |
| 6,757,445 B1 * | 6/2004 | Knopp ................... | 382/285 |
| 7,199,872 B2 | 4/2007 | Van Cranenbroeck | |
| 7,498,982 B1 * | 3/2009 | Kelly ................... | 342/357.14 |
| 7,720,703 B1 * | 5/2010 | Broughton ............ | 705/8 |
| 2006/0167728 A1 * | 7/2006 | Siegel et al. ........... | 705/7 |

OTHER PUBLICATIONS

Lazio, Peter, OPUS Observations, Sep. 2006., Surveying and Land Information Science; Gaithersburg (1538-1242) vol. 66,Iss.3;p. 185.*

* cited by examiner

*Primary Examiner* — William L Bashore
*Assistant Examiner* — Jordany Núñez (57) ABSTRACT

A method of improving workflow while performing a network adjustment associated with surveying data is disclosed. A first window containing a plan view which graphically displays at least one input is provided. The input is associated with surveying data. A second window contains a report which displays the input in text form is provided. In sync with each other, the plan view and the report are arranged within a GUI to present at least one network adjustment result utilizing the input. A status of at least one network adjustment result is indicated within the plan view and the report, wherein the status may include an error associated with the input. Additionally, interactive analysis capabilities and interactive modification capabilities are provided, wherein a change in the plan view is reflected in the report and a change in the report is reflected in the plan view.

18 Claims, 5 Drawing Sheets

Start

↓

Provide a first window containing a plan view, wherein said plan view is configured to graphically display at least one input, said input associated with surveying data.
405

↓

Provide a second window containing a report, wherein said report is configured to display said input in text form.
410

↓

Arrange said plan view and said report within a graphical user interface (GUI) to present at least one network adjustment result utilizing said input, wherein said plan view and said report are in sync with each other.
415

↓

Indicate within said plan view and said report a status of said at least one network adjustment result, wherein said status may include an error corresponding to said input.
420

↓

Provide interactive analysis capabilities and interactive modification capabilities of said at least one network adjustment result, wherein a change in said plan view is reflected in said report, and a change in said report is reflected in said plan view.
425

↓

End

Start

↓

Provide a first window containing a plan view, wherein said plan view is configured to graphically display at least one input, said input associated with surveying data.
505

↓

Provide a second window containing a report, wherein said report is configured to display said input in text form.
510

↓

Arrange said plan view and said report within a graphical user interface (GUI) to present at least one network adjustment result utilizing said input, wherein said plan view and said report are in sync with each other.
515

↓

Indicate within said plan view and said report a status of said at least one network adjustment result, wherein said status may include an error corresponding to said input.
520

↓

Provide an updated said at least one network adjustment result in response to an adjustment instruction.
525

↓

Remove a selected input from said plan view and said report in response to a disablement instruction.
530

↓

Automatically change said report to reflect a selected change in said plan view and automatically changing said plan view to reflect a selected change in said report.
535

↓

End

INTERACTIVE ANALYSIS OF NETWORK ADJUSTMENT RESULTS

TECHNICAL FIELD

The present invention relates to the field of surveying, and more particularly to network adjustments.

BACKGROUND ART

Network adjustment is a mathematical approach that an advanced surveyor is usually performing when calculating coordinates. The inputs used to perform network adjustments are measurements, which may be taken by a surveying instrument. When these measurements agree with each other, then there are no errors. However, often these measurements disagree, creating tension in the network. The tension in the network is symptomatic of sources of error in the network, or in other words, bad measurements.

The task for the surveyor becomes to identify the bad measurements. When a bad measurement is identified, it is disabled. A network adjustment program is run again while computing the remaining measurements, to determine if the overall result is better. If it is not possible to disable a particular bad measurement, then the surveyor has to go out into the field and redo the measurement. If the surveyor is confident that he has eliminated all bad measurements, he will do a final network adjustment which will properly distribute the remaining measurement errors and estimate the final accuracies of the points and measurements.

In an effort to identify a specific bad measurement, manufacturers have devised software programs which help identify these sources of tension. For example, a bad measurement is characterized by certain statistical results, which are communicated via a text form in a report. Additionally, corresponding graphically displayed measurements are communicated through a user interface.

Presently, the current technology provides for a report to be opened in an external web browser. This report will indicate a failed measurement. Then, in order to view the failed measurement, a user interface containing a graphical representation of all the measurements is opened. All measurements tend to be visibly labeled with identifiers corresponding to the report's description. The failed measurement is found, and then disabled. From the user interface screen, a network adjustment report is run again. A user switches back to the report screen to determine if all measurements are now relatively error free. This round trip process continues until the user is satisfied with the overall network adjustment results, such as when all failed measurements are found.

However, this round trip process in adjusting network results to rid the report of all failed measurements takes much time and is cumbersome. Users have to find their way back into the user interface from the report, and identify measurements that belong to a particular text line in the report. In the process of trying to rid the program of all failed measurements, users have to negotiate between several windows, windows which do not have a user friendly connection with each other. Additionally, even if a user disables a measurement from the user interface window, the report describing the measurement shows this measurement as being enabled, leading to confusion, and making it difficult to track changes. Hence, a technology which provides a more user friendly method of negotiating between windows and performing network adjustments is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of improving workflow while performing a network adjustment associated with surveying data is disclosed. A first window containing a plan view is provided, wherein the plan view is configured to graphically display at least one input, wherein the input is associated with surveying data. A second window containing a report is provided, wherein the report is configured to display the input in text form. The plan view and the report are arranged within a graphical user interface to present at least one network adjustment result from the input, wherein the plan view and the report are in sync with each other. A status of at least one network adjustment result is indicated within the plan view and the report, wherein the status may include an error associated with the input. Additionally, interactive analysis capabilities and interactive modification capabilities are provided, wherein a change in the plan view is reflected in the report and a change in the report is reflected in the plan view.

BRIEF DESCRIPTION OF THE DRAWINGS

The accompanying drawings, which are incorporated in and form a part of this specification, illustrate embodiments of the present technology for improving workflow while performing a network adjustment associated with surveying data and, together with the description, serve to explain principles discussed below.

The drawings referred to in this description should be understood as not being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Overview

As described herein, one problem with the current method used to perform network adjustments is the cumbersome process of switching between screens in order to disable failed measurements. Additionally, the user interface screen does not clearly identify information corresponding to the text within the report screen, such as failed measurements. This lack of clarity results in wasted resources since the user has to spend much time perusing the user interface to find a particular failed measurement in order to disable or enable it. Hence, the process of switching between screens and repeatedly disabling and enabling measurements in order to obtain a satisfactory overall network adjustment result is very time consuming.

However, by utilizing the network adjustment module implementation described herein, an interactive analysis of network adjustment results is provided. For example, the measurements represented in graphical form are interconnected and within the same graphical user interface (GUI) as the text information in the report. The failed measurements indicated in the report and shown in graphical form may be easily deciphered and manipulated without switching between screens. The results of the network adjustment and the errors occurring within the network adjustment results are presented within the same user interface. A user may then analyze and/or modify the network adjustment results while viewing both the results and errors at the same time.

The following discussion will begin with a description of the notation and nomenclature used in regards to the present technology. The discussion will then focus on embodiments of the present technology that provide a system and method for improving workflow while performing a network adjustment associated with surveying data.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the described arts to most effectively convey the substance of their work to others skilled in their art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present detailed description, discussions utilizing terms such as "performing", "providing", "arranging", "utilizing", "indicating", "removing", "changing", "selecting", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

Example Computer System Environment

Figure 1:
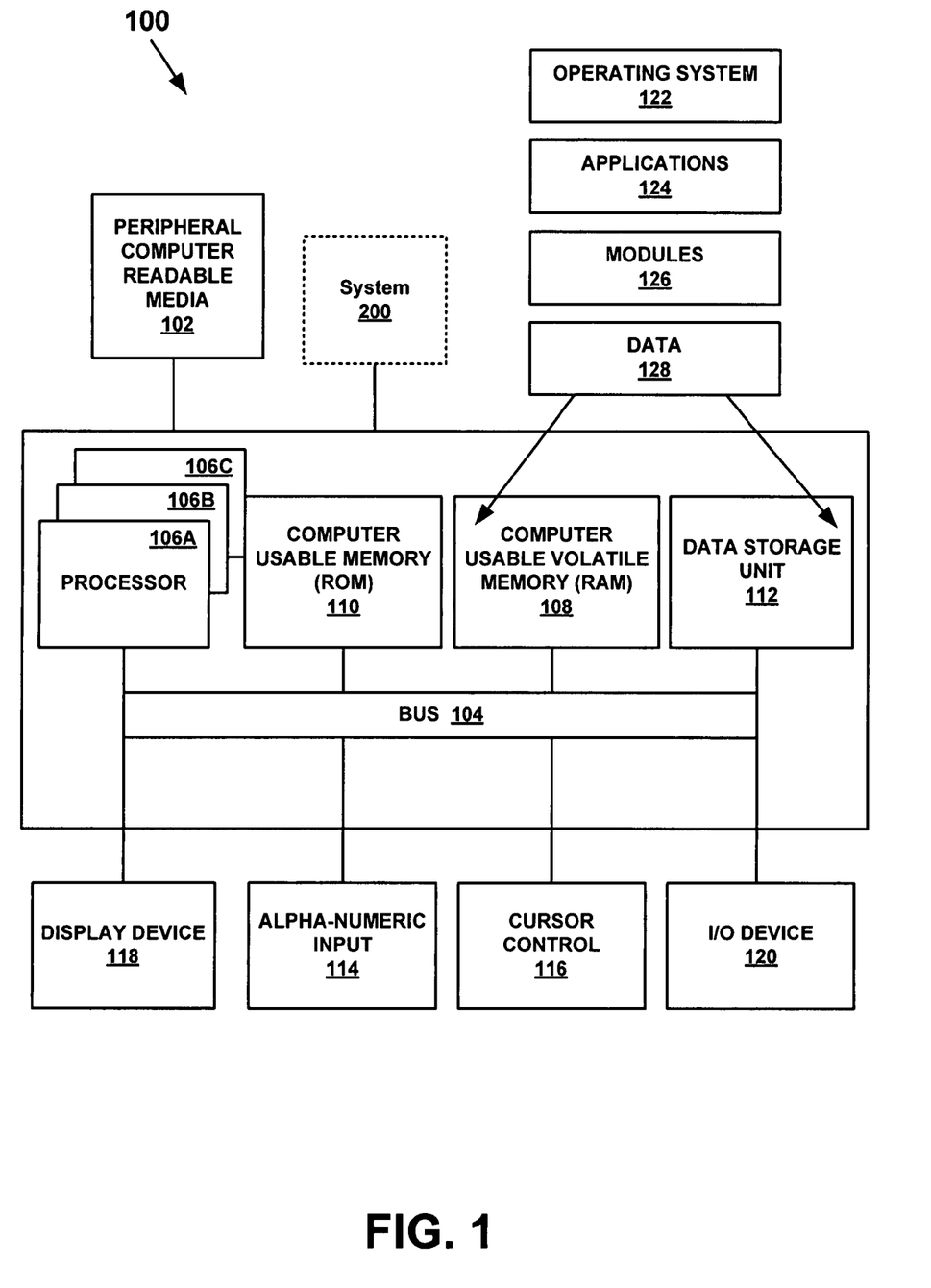
FIG. 1 is a diagram of an example computer system used in accordance with embodiments of the present technology in accordance with one embodiment of the present invention.

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example only, and that the present technology can operate on or within a number of different computer systems including general purpose networked computer systems, embedded computer systems, optical computer systems, virtual computer systems, server devices, client devices, various intermediate devices/nodes, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors.

System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions.

System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating, presenting, or displaying graphic images and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands.

System 100 also includes an I/O device 120 for coupling system 100 with external entities. For example, in one embodiment, I/O device 120 is a modem for enabling wired or wireless communications between system 100 and an external network such as, but not limited to, the Internet.

Figure 2:
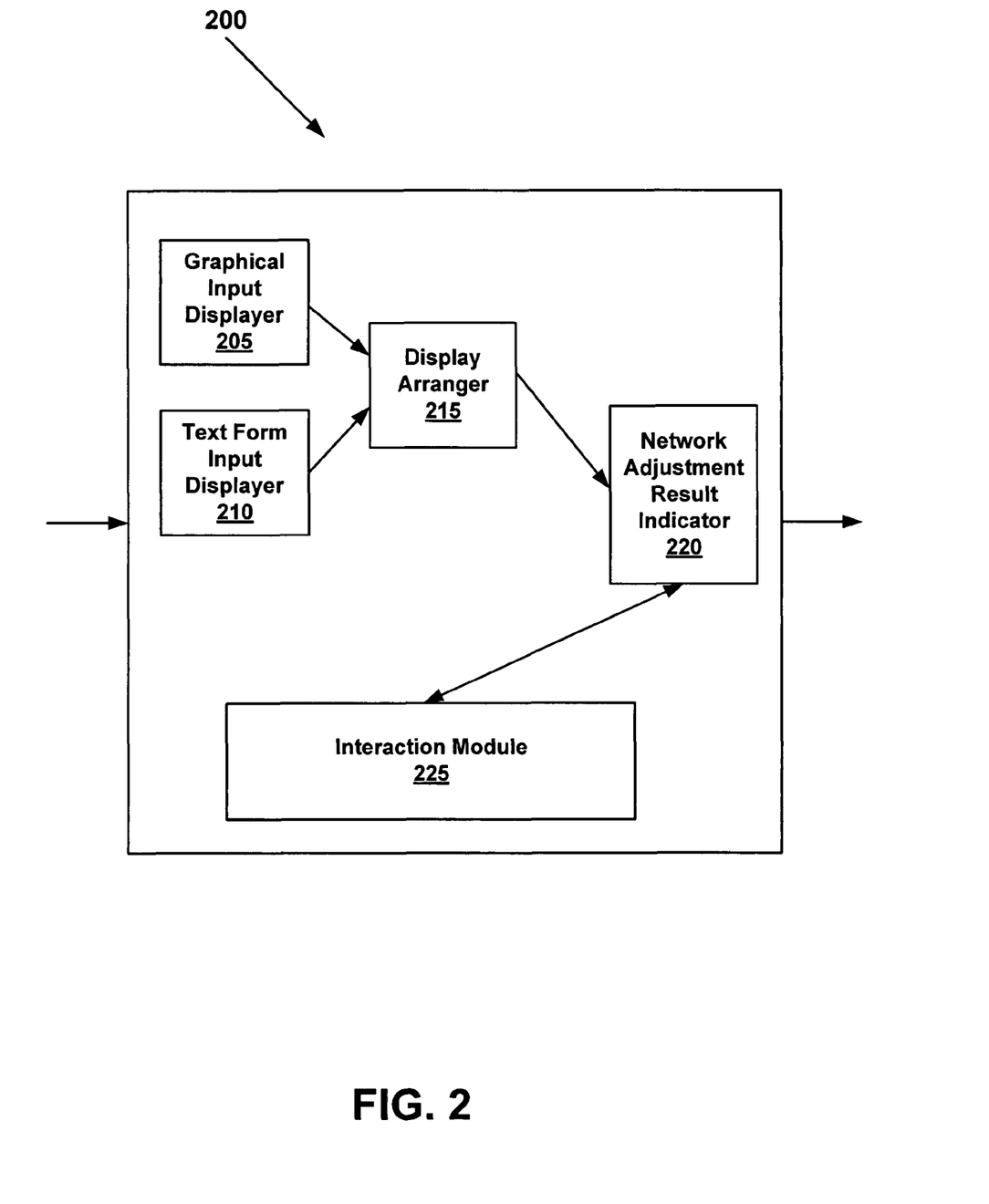
FIG. 2 is an example system for improving workflow while performing a network adjustment associated with surveying data in accordance with one embodiment of the present technology.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology is stored, for example, as an application 124 or module 126 in memory locations within RAM 108, computer readable media within data storage unit 112, and/or peripheral computer readable media 102. Additionally, the present technology, system 200, a system for improving workflow while performing a network adjustment associated with surveying data, is communicatively coupled with system 100. It is appreciated that system 200 may also be coupled with bus 104.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the exemplary computing system 100.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

System for Improving Workflow while Performing a Network Adjustment Associated with Surveying Data With reference now to FIG. 2, a block diagram is shown of a system 200 for improving workflow while performing a network adjustment associated with surveying data. It is appreciated that system 200 illustrates one example embodiment, and that other configurations within the scope of the present technology are possible. As shown in FIG. 2, system 200 is comprised of a graphical input displayer 205, a text form input displayer 210, a display arranger 215, a network adjustment result indicator 220, and an interaction module 225.

In one embodiment, a graphical input displayer 205 is configured to graphically display at least one input with a plan view, wherein the plan view is contained within a first window. The input is associated with surveying data. Additionally, in one embodiment, a text form input displayer 210 is configured to display the input in text form within a report, wherein the report is contained within a second window.

Figure 3:
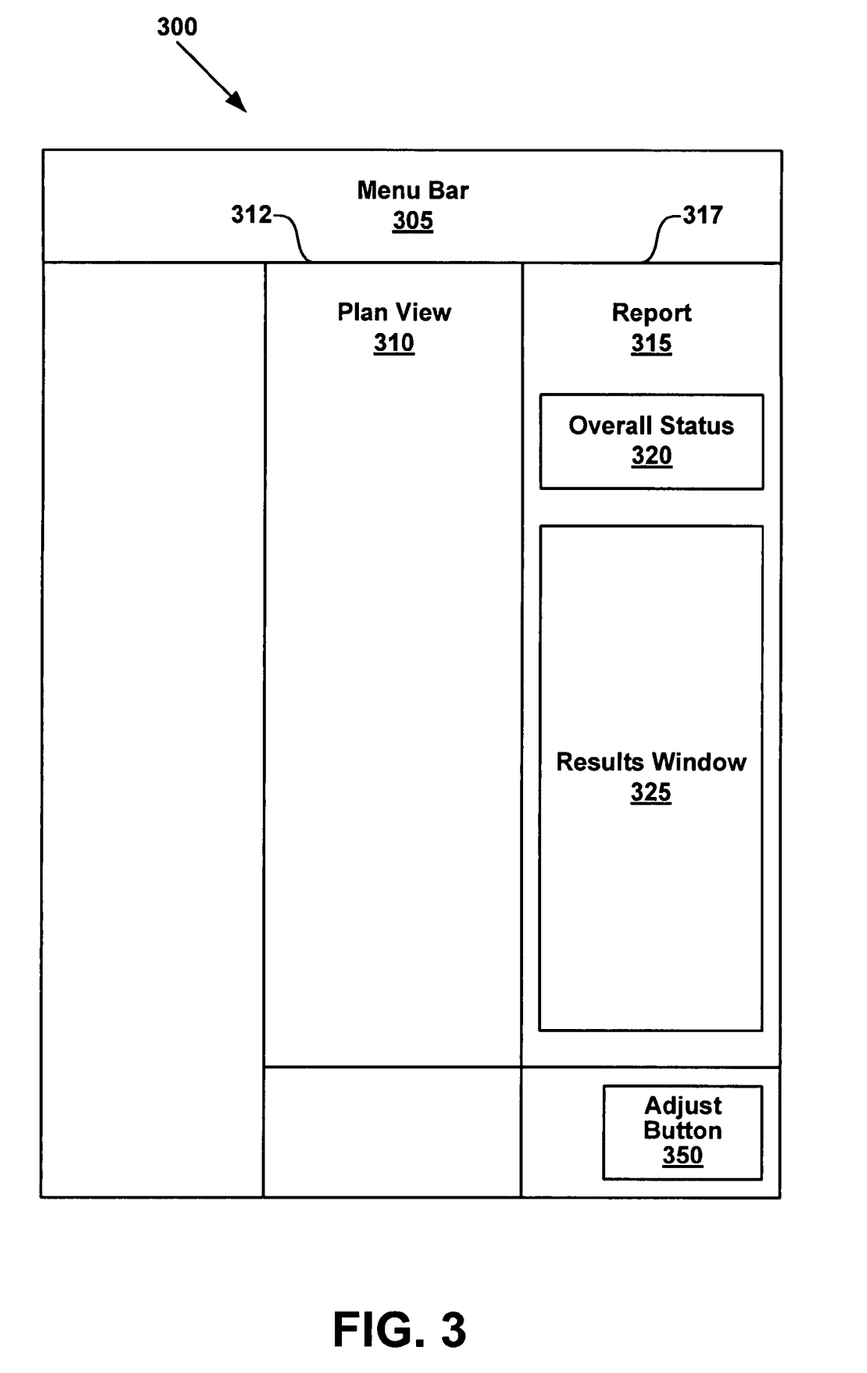
FIG. 3 is a block diagram showing an example implementation of a system for improving workflow while performing a network adjustment associated with surveying data in accordance with one embodiment of the present technology.

For example, referring now to FIG. 3, an example implementation of a system for improving workflow while performing a network adjustment associated with surveying data is shown. FIG. 3 is a graphical user interface showing a first window 312 containing plan view 310, and a second window 317 containing report 315. Plan view 310 contains a graphically displayed representation of the surveying measurements taken, and input into computer system 100. More specifically, in one embodiment, these graphical representations consist of measurements connecting different points of interest. For example, these points of interest may be measurements taken and input into computer system 100. In another embodiment, these graphical representations may be of control coordinates. These control coordinates are determined and input into computer system 100. Overall, the input which is graphically displayed is that which is associated with surveying data, such as but not limited to measurements and control coordinates. For purposes of brevity and clarity the input of measurements will be used within examples of the present technology. It is appreciated that the input may be something other than measurements.

In one example of the present technology, display arranger 215 is configured to arrange plan view 310 and report 315 within a graphical user interface 300 to present at least one network adjustment result utilizing the input described herein. Plan view 310 and report 315 are in sync with each other. For example, when a network adjustment is performed, a graphical representation of the result will be displayed in plan view 310, and a text form of the result will be displayed in report 315. Since plan view 310 and report 315 are in sync with each other, the results appear at or about the same time in each respective display window.

In another example of the present technology, a network adjustment result indicator 220 is configured to indicate within plan view 310 and report 315 a status of at least one network adjustment result, wherein the status may include an error corresponding to the input. Within plan view 310, status refers to a graphical representation of the text form of data within report 315. This graphical representation may indicate bad and good measurements, as well as bad and good control coordinates. Indicators used with the plan view's graphical representation may include colored markings and/or shaped markings, as well as text. For example, one bad measurement may be highlighted, or represented by a colored ellipse adjacent to a text identifier corresponding to the text form of data appearing within report 315. Another bad measurement may be represented by just an ellipse larger than all the rest, overlaying an endpoint of a measurement.

Within report 315, status may refer to the results of at least one culled measurement which was computer analyzed. For example, it may refer to the overall status of the network adjustment performance. Overall status refers to, in part, what in some cases is called the 'reference factor'. The reference factor is a number, whose meaning identifies the network adjustment performance's overall success. The survey has to provide a priori accuracies for all measurements and control points that he includes in the network adjustment. If these a priori accuracies correctly reflect the accuracy of the measurement process the reference factor is expected to be close to one. Therefore, a reference factor close to one indicates that the data within agrees with each other. Whereas a number such as 3.40 indicates that there is some bad data within and more error analysis is needed.

Furthermore, overall status also refers to, in part, a Chi square test and degrees of freedom information. A Chi square test tests if the reference factor is good enough or is not good enough, depending upon a number of variables. Apart from the Chi Square test, there are numerous other statistical tests which can be used to identify bad measurements.

Additionally, report 315 comprises results window 325. Results window 325 may contain any sort of data which corresponds to and/or relates to the graphical representations within plan view 310. For example, report 315 may contain error indicators, point identifiers, error information, measurement identifiers and dimensional data associated with identified measurements.

In one embodiment network adjustment result indicator 220 comprises an error indicator. Error indicator is configured to indicate an error of the input in text form utilizing a noticeable marking. For example, error indicators may be in the form of text that may or may not be highlighted, and shapes which may or may not be color marked, such as but not limited to yellow flags or red ellipses. There may be any number of error indicators.

A point identifier functions to identify a specific point at the end of a measurement, such as through a number and/or letters. Error information includes that which identifies a point identifier's location and errors connected thereto. This information may include but is not limited to a northing error, easting error, elevation error, and height error. Additionally, a fixed status may also be displayed, even though it does not reference an error.

A measurement identifier functions to identify a measurement by a number and/or letter corresponding to a measurement graphically displayed in plan view 310. Data associated with an identified measurement describe characteristics of the identified measurement such as but not limited to azimuth, ellipsoid distance, and change in height.

In one embodiment of the present technology, interaction module 225 is configured to provide interactive analysis capabilities and interactive modification capabilities of said at least one network adjustment result, wherein a change in plan view 310 is reflected in report 315, and a change in report 315 is reflected in plan view 310. Interactive analysis capabilities refer to, for example, an action in response to a user selecting a certain measurements within plan view 310, such as by clicking on this measurement with a mouse, and information associated with this measurement appearing in report 315 about or at the same time. It is appreciated that there exists a number of ways to 'select' information on a user interface screen, such as by using a mouse, voice commands, and/or the keyboard.

Interactive modification capabilities refer to, for example, an action in response to a user's instruction such that both plan view 310 and report 315 reflect the response to this instruction. For example, in one embodiment, interaction provider 225 comprises an input disabler. Input disabler is configured to disable a selected input from plan view 310 and report 315 in response to a disablement instruction. For instance, a response to a user's instruction to disable a particular measurement will be realized in such a way as both plan view 310 and report 315 disable this measurement according to the instruction. A disabled measurement may still be displayed in plan view 310 and report 315, but the measurement may be displayed with a certain color indicating a disabled status. A disabled measurement will not take part in any further network adjustments or other operation. Deleted measurements, on the other hand, are completely removed from the system. So a deleted measurement has to immediately disappear from plan view 310 and report 315. Many times, a surveyor will disable a measurement, but not delete bad measurements.

In one embodiment, disablement refers to making a measurement inactive from plan view 310 and the corresponding measurement information within report 315, or vice versa. In another embodiment of the present technology, a response to a user's instruction to enable a particular measurement will be realized by both plan view 310 and report 315 enabling this measurement according to the instruction. In one embodiment, enabling refers to making a measurement active in plan view 310 and the measurement's corresponding measurement information within report 315, or vice versa.

In one embodiment, interaction module 225 includes automatic input selector. Automatic input selector is configured to automatically select the graphically displayed input corresponding to the input in text form in response to a selection of the input in text form. Automatic input selector is also configured to automatically select the input in text form corresponding to the graphically displayed input in response to a selection of the graphically displayed input. For example, if the user selects the graphically displayed measurements 323E-2059 in plan view 310, then information associated with measurements 323E-2059 will appear in report 315.

In another example of the present technology, network adjustment module includes a network adjustment updater. Network adjustment updater is configured to update at least one network adjustment result in response to an adjustment instruction. Update refers to incorporating the latest changes to the data within plan view 310 and report 315, and providing a result displayed both in plan view 310 and report 315. An adjustment instruction refers to a user's instruction to update the prior network adjustment results to incorporate the latest changes, if any, made to the data within plan view 310 and report 315.

Figure 4:
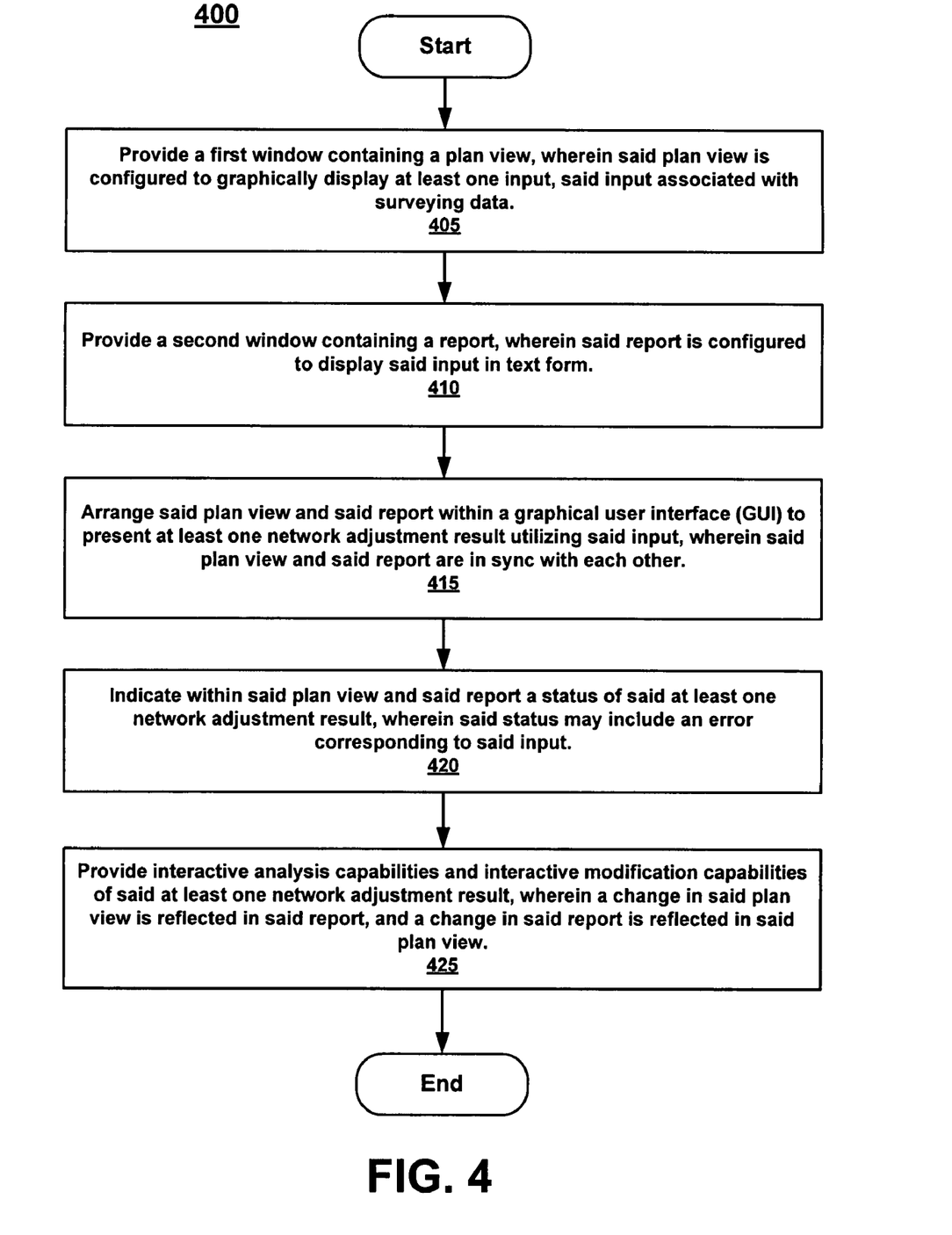
FIG. 4 is a flow diagram of an example method of improving workflow while performing a network adjustment associated with surveying data in accordance with one embodiment of the present technology.
Figure 5:
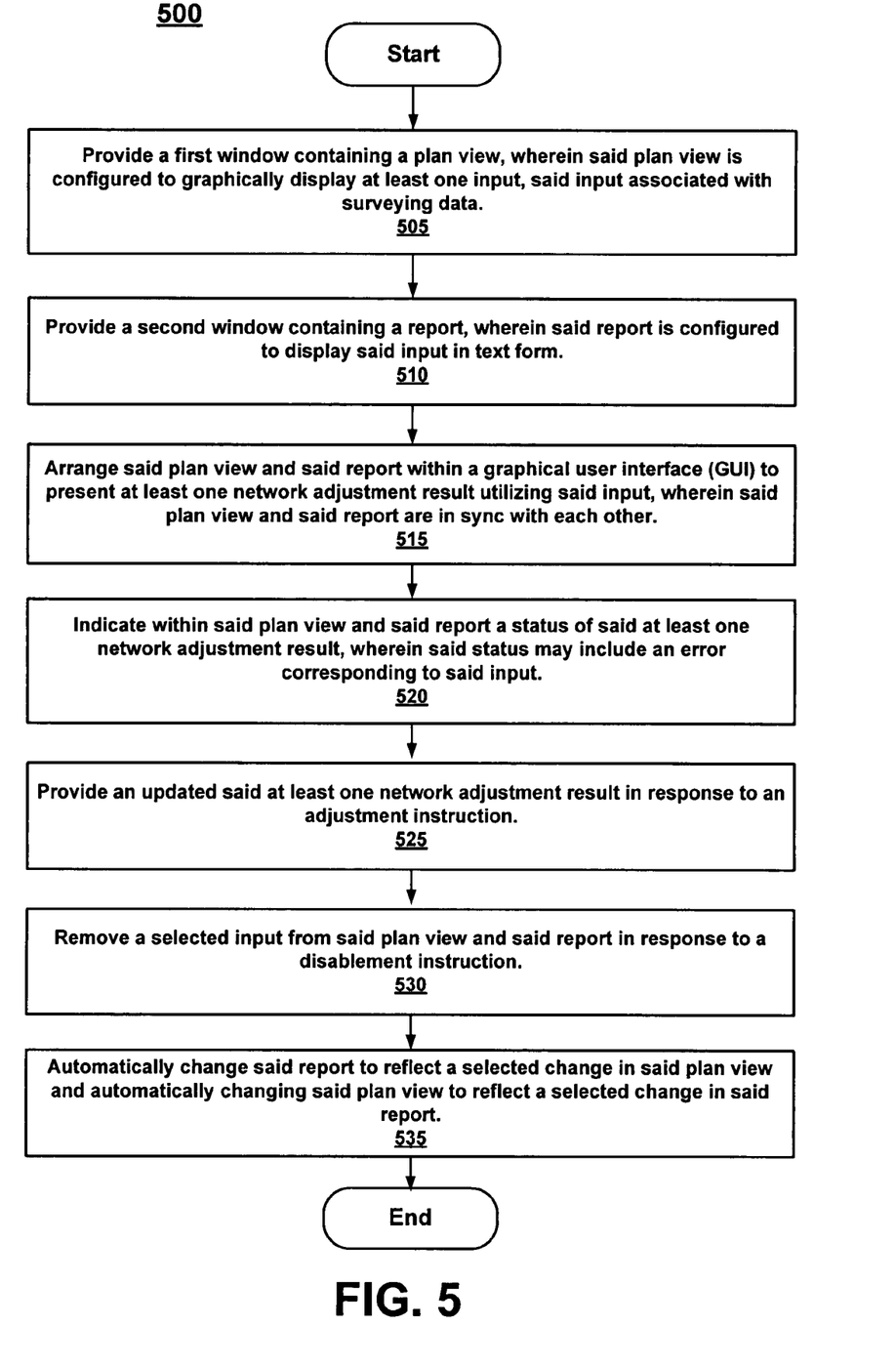
FIG. 5 is a flow diagram of an example method of instructions on a computer-usable medium wherein the instructions when executed cause a computer system to perform a method for improving workflow while performing a network adjustment associated with surveying data in accordance with one embodiment of the present technology.

Operation of the Present System for Improving Workflow while Performing a Network Adjustment Associated with Surveying Data The following discussion sets forth in detail the operation of present technology through a description of example embodiments. With reference to FIGS. 4 and 5, flow diagrams 400 and 500 each illustrate example steps used by methods and/or processes according to various embodiments described herein. Flow diagrams 400 and 500 include processes that, in various embodiments, are carried out by a processor under the control of computer-readable and computer-executable instructions.

The computer-readable and computer executable instructions reside, for example, in data storage features such as (computer usable) data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 400 and 500 such steps are examples. It is appreciated that embodiments described herein are well suited to performing various other steps or variations of the steps recited, that the recited steps may be performed in an order different than presented, and that not all of the recited steps may performed in every embodiment.

Method for Improving Workflow while Performing a Network Adjustment Associated with Surveying Data Referring now to 405 of FIG. 4, and to FIG. 3, one embodiment provides a first window containing plan view 310, wherein plan view 310 is configured to graphically display at least one input. The input is associated with surveying data. For example, plan view 310 may display a group of measurements with labeled endpoints. The endpoints are labeled with text and/or numbers described herein. These endpoints each may be surrounded by an ellipse whose size corresponds to the statistical accuracy of the position and height of the endpoint. Also, the accuracy of a measurement itself may be shown by an ellipse which may be positioned at the midpoint of the measurement. In another example, plan view 310 may display a group of coordinates. It is appreciated that in other embodiments, an input may be graphically displayed with a noticeable marking in some manner other than with an ellipse as described herein.

Referring now to 410 of FIG. 4, and to FIG. 3, one embodiment provides a second window containing report 315, wherein report 315 is configured to display at least one input in text form. For example, report 315 may display input represented by numbers or letters.

Referring to 415 of FIG. 4, and to FIG. 3, one embodiment of the present technology arranges plan view 310 and report 315 within graphical user interface 300 to present at least one network adjustment result utilizing input, wherein plan view 310 and report 315 are in sync with each other.

Referring now to 420 of FIG. 4, and to FIG. 3, one embodiment indicates within plan view 310 and report 315 a status of at least one network adjustment result, wherein the status may include an error corresponding to the input. In one example, the error associated with the input is indicated utilizing a marking resembling a flag. In another example, the error associated with the input is indicated utilizing a color marking, as described herein.

In yet another embodiment, method 400 provides for indicating an overall status of at least one network adjustment result, wherein the overall status indicates a level of sources of error in the network. In one example, the present method calculates the status of an entire network adjustment result (involving measurements) in the form of a 'reference factor' described herein. When this reference factor is close to one, then the errors indicated by the network adjustment result may be considered correctly estimated, suggesting that the measurements within need no further adjustment. However, a reference factor reading of 3.10 would tend to indicate that a bad measurement exists, and the network needs further error analysis and adjustment.

Referring to 425 of FIG. 4, and to FIG. 3, one embodiment provides interactive analysis capabilities and interactive modification capabilities of at least one network adjustment result, wherein a change in plan view 310 is reflected in report 315, and a change in report 315 is reflected in plan view 310. That is, when a user instructs a change in plan view's 310 information, report's 315 corresponding information automatically changes in accordance with the instructed change. Furthermore, when a user instructs a change in report's 315 information, plan view's 310 corresponding information automatically changes in accordance with the instructed change.

In another embodiment of the present technology, graphically displayed input corresponding to input in text form is automatically selected in response to a selection of the input in text form. Additionally, in yet another embodiment, input in text form corresponding to graphically displayed input is automatically selected in response to a selection of graphically displayed input. For instance, if information relating to a certain graphically displayed measurements is selected for viewing from plan view 310, then the corresponding information in text form within report 315 is automatically selected and appears for viewing also. Additionally, if information relating to certain text is selected for viewing from report 315, then the corresponding information within plan view 310 is automatically selected and appears for viewing also.

In yet another embodiment of the present technology, a selected input from plan view 310 is disabled in response to a disablement instruction. For example, if it is determined that a certain measurement is suspected to be bad, then this measurement may be disabled (removed) from the grouping of measurements by a disabling instruction. This disabling instruction is provided to the system through a menu bar or some other possible manner of selection described herein.

In yet another embodiment of the present technology, at least one updated network adjustment result is provided in response to an adjustment instruction. For example, once a suspected bad measurement has been disabled, then an adjustment instruction is provided to the system. This adjustment instruction directs the system to run a network adjustment using the updated input involving the disablement of one measurement. This adjustment instruction may be performed in some cases through a menu bar, or a separate 'adjust' button, appearing on GUI 300. It is appreciated that there are a variety of ways other than those mentioned herein in which to arrange and account for instructional buttons described herein on GUI 300.

Additionally, a measurement may be enabled, or added back into a group of measurements. An adjustment instruction may also be given taking into account an added measurement. Adding a measurement back into a group of measurements may occur in the instance in which a suspected bad measurement was disabled, but later discovered to in fact not be bad. For example, suppose that a reference factor reads 3.10, and an error indicator indicates that measurement 323E-2059 is a suspected bad measurement. Additionally, GUI 305 displays a point identified as 324E to be surrounded by an ellipse that is larger than the other displayed ellipses and/or not positioned in the same direction, indicating that the accuracy of point 324E has been deteriorated by at least one bad measurement.

Measurement 323E-2059 is selected in report 315 through clicking with the mouse on the text information regarding measurement 323E-2059, or any other manner which involves the standard technique for enabling the selection of information displayed on a GUI. Then, the 'adjust' button is pushed, to update the network adjustment results, rendering a reference factor closer to the former one of 3.10. So, the overall error has not increased or decreased very much. From this update, it is determined that measurement 323E-2059 was not in fact a bad measurement, and needs to be added back into the group of measurements (enabled). Again, a menu bar may aid in the process of adding a measurement back into the group of measurements. For example, through a pull down menu, the command "Enable" may be selected. Overall, the user decides whether or not a measurement is bad and needs to be disabled or enabled.

In sum, the operation of a method for improving workflow while performing a network adjustment associated with surveying data is a process in which, due to the interactive analysis capabilities and interactive modification capabilities, errors within the network adjustment results may be pinpointed more easily in both plan view 310 and report 315. Initially, measurements are taken and input into system 100, or directly into system 200. An initial network adjustment is performed, which includes certain statistical tests for all measurements. If one fails the test, it is suspected to be a bad measurement (or error). Then, this input is displayed in a graphical format and in a text format within GUI 300. A user is able to identify suspected errors in the measurement data displayed due to one or more error indicators. The user either disables or enables a specifically identified measurement associated with the suspected error. Another network adjustment is then performed to update network adjustment results. The overall error status is then determined from these network adjustment results. Depending upon the overall error status, more suspected errors will be disabled or enabled followed by another network adjustment. The present technology provides for a more efficient and resourceful way to identify sources of error within a network adjustment. In some cases, there may be thousands of measurements, requiring many network adjustments to reduce or eliminate the bad measurements.

With reference now to FIG. 5, a flowchart 500 of instructions on a computer-usable medium wherein the instructions when executed cause a computer system to perform a method of performing a network adjustment associated with surveying data is shown in accordance with one embodiment of the present technology.

Referring now to 505 of FIG. 5 and to FIG. 3, first window 312 containing plan view 310 is provided, wherein plan view 310 is configured to graphically display at least one input. This input is associated with surveying data. Since an explanation herein of the aforementioned providing plan view 310 within window 312 is described herein in regards to 405 of FIG. 4 and applies to 505 of FIG. 5, for purposes of clarity and brevity this explanation will not be repeated.

Referring now to 510 of FIG. 5 and to FIG. 3, second window 317 containing report 315 is provided, wherein report 315 is configured to display the input in text form. Since an explanation herein of the aforementioned providing report 315 within window 317 is described herein in regards to 410 of FIG. 4 and applies to 510 of FIG. 5, for purposes of clarity and brevity this explanation will not be repeated.

Referring now to 515 of FIG. 5 and to FIG. 3, plan view 310 and report 315 are arranged within GUI 300 to present at least one network adjustment result utilizing input, wherein plan view 310 and report 315 are in sync with each other. Since an explanation herein of the aforementioned arranging plan view 310 and report 315 within GUI 300 is described herein in regards to 415 of FIG. 4 and applies to 515 of FIG. 5, for purposes of clarity and brevity this explanation will not be repeated.

Referring now to 520 of FIG. 5 and to FIG. 3, a status of at least one network adjustment result is indicated within plan view 310 and report 315, wherein the status may include an error corresponding to the input. Since an explanation herein of the aforementioned indication within plan view 310 and report 315 of a status of at least one network adjustment result is described herein in regards to 420 of FIG. 4 and applies to 520 of FIG. 5, for purposes of clarity and brevity this explanation will not be repeated.

Additionally, one embodiment of the present technology provides for arranging at least one error corresponding to input in order of decreasing value, wherein the error is identified with dimensional data. For example, within report 315, the measurement identified by an error indicator to be the largest possible bad measurement is the measurement which is positioned at the front and top of a list of suspected errors, along with its data associated with the input data. The measurement positioned right below the largest possible bad measurement is the second largest possible bad measurement. This manner of positioning continues until there are no more possible bad measurements to identify and display in text form within report 315. It is appreciated that a positioning of measurements according to their dimensional values may not be a complete listing, as the system may be programmed to only display a certain number of measurements.

Referring now to 525 of FIG. 5 and to FIG. 3, at least one updated network adjustment result is provided in response to an adjustment instruction. Since an explanation herein of the aforementioned updated network adjustment result being provided in response to an adjustment instruction is described herein in regards to 425 of FIG. 4 and applies to 525 of FIG. 5, for purposes of clarity and brevity this explanation will not be repeated.

Referring now to 530 of FIG. 5 and to FIG. 3, one embodiment provides for a removal of a selected input from plan view 310 and report 315 in response to a disablement instruction. Since an explanation herein of the aforementioned providing for a removal of a selected input from plan view 310 and report 315 in response to a disablement instruction is described herein and applies to 530 of FIG. 5, for purposes of clarity and brevity this explanation will not be repeated.

Referring now to 535 of FIG. 5 and to FIG. 3, one embodiment provides for automatically changing report 315 to reflect a selected change in plan view 310 and automatically changing plan view 310 to reflect a selected change in report 315. Since an explanation herein of the aforementioned providing for automatically changing report 315 to reflect a selected change in plan view 310 and automatically changing plan view 310 to reflect a selected change in report 315 is described herein and applies to 535 of FIG. 5, for purposes of clarity and brevity this explanation will not be repeated.

Thus, the present technology provides a method for improving workflow while performing a network adjustment associated with surveying data. Plan view 310 is contained within window 312, and graphically displays input associated with surveying data. Report 315 is contained within window 317 and displays input in text form. Plan view 310 and report 315 are arranged within GUI 300 in order to present a network adjustment result utilizing the input, wherein plan view 310 and report 315 are in sync with each other. Plan view 310 and report 315 indicate a status of a network adjustment result, wherein the status may include an error associated with the input. Interactive analysis capabilities and interactive modification capabilities of a network adjustment result is provided, wherein a change in plan view 310 is reflected in report 315, and a change in report 315 is reflected in plan view 310.

Hence, instead of switching back and forth between graphical displays of measurements and the data in text form associated with these measurements in order to identify a source of error, the user is able to view a single screen within GUI 300. In this way, a user may easily find a source of error through the interactive capabilities of plan view 310 and report 315. The method and system provided herein saves time and resources in that less time is needed to find a source of error, thereby utilizing less resources.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of improving workflow while performing a network adjustment associated with surveying data, said method comprising:
   providing a first window containing a plan view, wherein said plan view is configured to graphically display at least one input, said input associated with surveying data;
   providing a second window containing a report, wherein said report is configured to display said input in text form;
   arranging said plan view and said report within a graphical user interface (GUI) to present at least one network adjustment result utilizing said input, wherein said plan view and said report are in sync with each other;
   indicating within said plan view and said report a status of said at least one network adjustment result, wherein said status may include an error associated with said input; and
   providing interactive analysis capabilities and interactive modification capabilities of said at least one network adjustment result, wherein a change in said plan view is reflected in said report, and a change in said report is reflected in said plan view and wherein a disablement instruction removes a selected input from both said plan view and said report.

2. The method of claim 1, further comprising:
   in response to a selection of said input in text form, automatically selecting said graphically displayed input corresponding to said input in text form.

3. The method of claim 1, further comprising:
   in response to a selection of said graphically displayed input, automatically selecting said input in text form corresponding to said graphically displayed input.

4. The method of claim 1, further comprising:
   indicating said error associated with said input utilizing a shape marking.

5. The method of claim 1, further comprising:
   indicating said error associated with said input utilizing a color marking.

6. The method of claim 1, wherein said providing interactive analysis capabilities further comprises:
   providing an updated said at least one network adjustment result in response to an adjustment instruction.

7. The method of claim 1, further comprising:
   indicating an overall status of said at least one network adjustment result, wherein said overall status indicates a level of a source of error in the network.

8. A system for improving workflow while performing a network adjustment associated with surveying data, said network adjuster comprising:
   a graphical input displayer configured to graphically display at least one input within a plan view, wherein said plan view is contained within a first window, said input associated with surveying data;
   a text form input displayer configured to display said input in text form within a report, wherein said report is contained within a second window;
   a display arranger configured to arrange said plan view and said report within a graphical user interface (GUI) to present at least one network adjustment result utilizing said input, wherein said plan view and said report are in sync with each other;
   a network adjustment result indicator configured to indicate within said plan view and said report a status of said at least one network adjustment result, wherein said status may include an error associated with said input; and
   an interaction module configured to provide interactive analysis capabilities and interactive modification capabilities of said at least one network adjustment result, wherein a change in said plan view is reflected in said report, and a change in said report is reflected in said plan view; and
   an input disabler configured to remove a selected input from said plan view and said report in response to a disablement instruction.

9. The system of claim 8, further comprising:
   an automatic input selector configured to automatically select said graphically displayed input corresponding to said input in text form in response to a selection of said input in text form, and to automatically select said input in text form corresponding to said graphically displayed input in response to a selection of said graphically displayed input.

10. The system of claim 8, further comprising:
    an error indicator configured to indicate an error of said input in text form utilizing a noticeable marking.

11. The system of claim 8, further comprising:
    a network adjustment updater configured to update said at least one network adjustment result in response to an adjustment instruction.

12. Instructions on a non-transitory computer-usable medium wherein the instructions when executed cause a computer system to perform a method for improving workflow while performing a network adjustment associated with surveying data, said method comprising:
    providing a first window containing a plan view, wherein said plan view is configured to graphically display at least one input, said input associated with surveying data;
    providing a second window containing a report, wherein said report is configured to display said input in text form;
    arranging said plan view and said report within a graphical user interface (GUI) to present at least one network adjustment result utilizing said input, wherein said plan view and said report are in sync with each other;
    indicating within said plan view and said report a status of said at least one network adjustment result, wherein said status may include an error associated with said input;
    providing an updated said at least one network adjustment result in response to an adjustment instruction;
    removing a selected input from said plan view and said report in response to a disablement instruction; and
    automatically changing said report to reflect a selected change in said plan view and automatically changing said plan view to reflect a selected change in said report.

13. The non-transitory computer-usable medium of claim 12, further comprising:
    in response to a selection of said input in text form, automatically selecting said graphically displayed input corresponding to said input in text form.

14. The non-transitory computer-usable medium of claim 12, further comprising:
    in response to a selection of said graphically displayed input, automatically selecting said input in text form corresponding to said graphically displayed input.

15. The non-transitory computer-usable medium of claim 12, further comprising:

indicating an error of said input in text form utilizing a shape marking resembling the shape of a flag.

16. The non-transitory computer-usable medium of claim 12, further comprising:

indicating an error of said input in text form utilizing a color marking.

17. The non-transitory computer-usable medium of claim 12, further comprising:

indicating an overall status of said at least one network adjustment result, wherein said overall status indicates a level of a source of error in the network.

18. The non-transitory computer-usable medium of claim 12, further comprising:

arranging at least one said error corresponding to said input in order of decreasing value, wherein said error is identified with data associated with said input.

* * * * *